(12) United States Patent
Johnston

(10) Patent No.: US 10,111,388 B2
(45) Date of Patent: Oct. 30, 2018

(54) SQUARE OR RECTANGULAR HAY BALERS WITH LIQUID COATED HAY BALE FORMING ZONE

(71) Applicant: Elmo Park Pty. Ltd., West Albury, New South Wales (AU)

(72) Inventor: Richard Leonard Johnston, West Albury (AU)

(73) Assignee: Elmo Park Pty. Ltd., West Albury, New South Wales (AU)

( * ) Notice: Subject to any disclaimer, the term of this patent is extended or adjusted under 35 U.S.C. 154(b) by 0 days.

(21) Appl. No.: 15/525,948

(22) PCT Filed: Sep. 18, 2015

(86) PCT No.: PCT/AU2015/050562
§ 371 (c)(1),
(2) Date: May 10, 2017

(87) PCT Pub. No.: WO2016/074027
PCT Pub. Date: May 19, 2016

(65) Prior Publication Data
US 2017/0311549 A1   Nov. 2, 2017

(30) Foreign Application Priority Data

Nov. 11, 2014   (AU) ................. 2014904519

(51) Int. Cl.
*A01F 15/04* (2006.01)
*A01F 15/08* (2006.01)
*A01F 15/10* (2006.01)

(52) U.S. Cl.
CPC .......... *A01F 15/046* (2013.01); *A01F 15/042* (2013.01); *A01F 15/0816* (2013.01); *A01F 15/10* (2013.01)

(58) Field of Classification Search
CPC ......... A01F 15/0816; A01F 2015/0745; Y10S 56/23; A01D 41/127; A01D 43/14
(Continued)

(56) References Cited

U.S. PATENT DOCUMENTS 3,745,915 A * 7/1973 Rehm, Jr. ............. B30B 9/3035
100/38
4,185,549 A * 1/1980 Roepnack ........... A01F 15/0816
100/45
(Continued)

FOREIGN PATENT DOCUMENTS

AU          681888 B    9/1997
EP        0172434 A1    2/1986
(Continued)

OTHER PUBLICATIONS

International Search Report and Written Opinion dated Dec. 18, 2015, for corresponding PCT Application No. PCT/AU2015/050562.
(Continued)

*Primary Examiner* — Arpad Fabian-Kovacs
(74) *Attorney, Agent, or Firm* — Kinney & Lange, P.A.

(57) ABSTRACT

A square or rectangular hay baler (10) comprises a fore and aft hay bale forming zone, and a cut vegetation pick up and delivery arrangement for delivering cut vegetation to the hay bale forming zone. A compression plunger (19) of the hay baler (10) is movable in the fore and aft direction for compressing cut vegetation into a bale in the hay bale forming zone. A reservoir (23) retains a supply of non-toxic liquid surfactant or lubricant, and a pump (25) is provided for pumping the nontoxic liquid surfactant or lubricant from the reservoir (23) at a supply pressure to one or more discharge outlets (32) in the hay baler (10). Thereby, inwardly facing surfaces in the fore and aft hay bale forming
(Continued)

zone are at least partially coated with the non-toxic liquid surfactant or lubricant.

16 Claims, 2 Drawing Sheets

(58) Field of Classification Search
USPC .................................................. 100/73, 111
See application file for complete search history.

(56) References Cited

U.S. PATENT DOCUMENTS

| | | | | |
|---|---|---|---|---|
| 4,205,514 A * | 6/1980 | Wolrab | ............... | A01F 15/0816 100/73 |
| 4,228,638 A * | 10/1980 | Rabe | ................... | A01F 15/0816 100/74 |
| 4,327,537 A * | 5/1982 | Wolrab | ............... | A01F 15/0816 56/1 |
| 4,352,267 A * | 10/1982 | Mellinger | ........... | A01F 15/0816 100/71 |
| 4,453,460 A | 6/1984 | Rabe et al. | | |
| 4,459,798 A * | 7/1984 | Penfold | ............... | A01F 15/0816 100/45 |
| 4,916,888 A * | 4/1990 | Sheehan | ............. | A01F 15/0816 100/74 |
| 4,918,910 A * | 4/1990 | Sheehan | ............. | A01F 15/0816 100/45 |
| 6,615,710 B1 * | 9/2003 | Ishigaki | ............... | B01D 29/118 100/111 |
| 7,261,032 B2 * | 8/2007 | Schlesser | ............ | A01F 15/0816 100/73 |
| 7,370,575 B2 * | 5/2008 | Kraus | .................. | A01D 89/006 100/73 |
| 7,900,557 B2 * | 3/2011 | Freeman | ............. | A01F 15/0816 100/74 |
| 8,567,311 B2 * | 10/2013 | Kraus | ................. | A01F 15/0816 100/35 |
| 8,656,830 B2 * | 2/2014 | Kraus | ................. | A01F 15/0816 100/35 |
| 9,736,987 B2 * | 8/2017 | Kraus | ................. | A01F 15/0816 |
| 2004/0250694 A1 * | 12/2004 | Lynde | ................. | A01F 15/0715 100/8 |
| 2013/0190061 A1 * | 7/2013 | Kirchbeck | .............. | A01F 12/58 460/1 |
| 2016/0014960 A1 * | 1/2016 | Meagher | ............. | A01D 46/085 56/10.2 B |

FOREIGN PATENT DOCUMENTS

| | | |
|---|---|---|
| GB | 1281086 A | 7/1972 |
| GB | 1474178 A | 5/1977 |
| GB | 2033295 B | 8/1982 |

OTHER PUBLICATIONS

International Preliminary Report on Patentability dated Aug. 2, 2016, for corresponding PCT Application No. PCT/AU2015/050562.

* cited by examiner

SQUARE OR RECTANGULAR HAY BALERS WITH LIQUID COATED HAY BALE FORMING ZONE

FIELD OF THE INVENTION

The present invention relates to improvements in square or rectangular hay balers and particularly to hay balers for producing large sized hay bales of this type. The present invention also relates to apparatus for modifying square or rectangular hay balers.

BACKGROUND OF THE INVENTION

Frost or drought affected cut grass material for forming hay can have high sugar levels and in such circumstances, this high sugar level characteristic can cause clogging of the hay baling machine. Hay baling machines for producing square or rectangular hay bales typically have some form of pick up/delivery mechanism to pick up cut grass and similar materials from the ground and to deliver same along a delivery path or chute generally in a transverse direction to a precompression chamber where the material is pressed by a main compression bale plunger head in a compression direction along a path eventually permitting discharge rearwardly of a completed, tied bale from the bale chamber. The bale forming chamber may also have compression means in the upper and side faces of the chamber to provide an inwardly directed compressive force to the bale being produced to increase the hay density in the produced bale. The clogging of the bale chamber begins at the bale plunger head at its full stroke. The material builds up in the bale chamber corners. One attempt to solve the problem of hay clogging in hay balers of this type caused by frost or drought affected hay has been to coat relevant hay contacting surfaces of the machine with a Teflon coating. Attempts of this type have generally been somewhat unsuccessful in solving the problem primarily because the Teflon coating was not sufficiently hard wearing for the environment of its use.

The objective of the present invention is to provide a solution to the aforementioned problem that will be effective in preventing hay baler clogging when working on draught and frost affected materials.

SUMMARY OF THE INVENTION

In one aspect, the present invention provides a hay baler including: a fore and aft hay bale forming zone;
a cut vegetation pick up and delivery arrangement for delivering cut vegetation to said hay bale forming zone;
a compression plunger movable in the fore and aft direction for compressing cut vegetation into a bale in said hay bale forming zone;
a reservoir for retaining a supply of non-toxic liquid surfactant or lubricant;
pump means capable of pumping said non-toxic liquid surfactant or lubricant from said reservoir at a supply pressure to one or more discharge outlets in said hay baler whereby inwardly facing surfaces in said fore and aft hay bale forming zone are at least partially coated with said non-toxic liquid surfactant or lubricant.

Preferred aspects of the invention may be as defined in any one of claims 2 to 17 inclusive, the subject matter of these claims being included in the disclosure of this specification by this reference thereto.

In an embodiment, said fore and aft hay baling forming zone includes a precompression chamber, a bale compression chamber, and a bale discharge passage, all arranged in the fore and aft direction. Preferably, said cut vegetation pick up and delivery arrangement delivers said cut vegetation to said precompression chamber.

In an embodiment, a plurality of discharge outlets are mounted to or adjacent said fore and aft hay bale forming zone delivering, in use, said non-toxic liquid surfactant or lubricant in an inward direction, each of said discharge outlets being connected to said pump means. Each said discharge outlet is preferably a spray nozzle capable of spraying said non-toxic liquid surfactant or lubricant.

In an embodiment, said discharge outlets may all be arranged in a plane transverse to said fore and aft direction. Said plane is preferably transverse to said fore and aft hay bale forming zone is located forward of a forward limit position of a forward face of said compression plunger. Said plane is preferably located about 15 mm forward of said forward limit position of the forward face of said compression plunger. Alternatively, said plane is preferably located less than about 15 mm forward of said forward limit position of the forward face of said compression plunger.

The discharge outlets may be spaced from each other about a periphery of said fore and aft hay bale forming zone.

In an embodiment, said fore and aft hay bale forming zone has a square or rectangular internal cross-section.

At least one discharge outlet for said non-toxic liquid surfactant or lubricant is positioned to supply said non-toxic liquid surfactant or lubricant to a region of a delivery chute forming part of the cut vegetation pick up and delivery arrangement.

In an embodiment, the at least one discharge outlet is positioned in said delivery chute adjacent a precompression chamber of said fore and aft hay bale forming zone.

At least one discharge outlet for said non-toxic liquid surfactant or lubricant is preferably positioned to deliver said non-toxic liquid surfactant or lubricant to said precompression chamber.

In an embodiment, said non-toxic liquid surfactant or lubricant is a food grade oil, preferably, a vegetable oil.

In an embodiment, first flow line means is provided between said pump means and a distribution manifold, an adjustable flow rate control device being provided in said first flow line means. The hay baler may further include a plurality of second flow line means, each said second line flow means extending from said distribution manifold to a respective one of said discharge outlets.

BRIEF DESCRIPTION OF THE DRAWINGS

The present invention will now be described, by way of non-limiting example, with reference to the accompanying drawings, in which.

DESCRIPTION OF THE PREFERRED EMBODIMENTS

Figure 1:
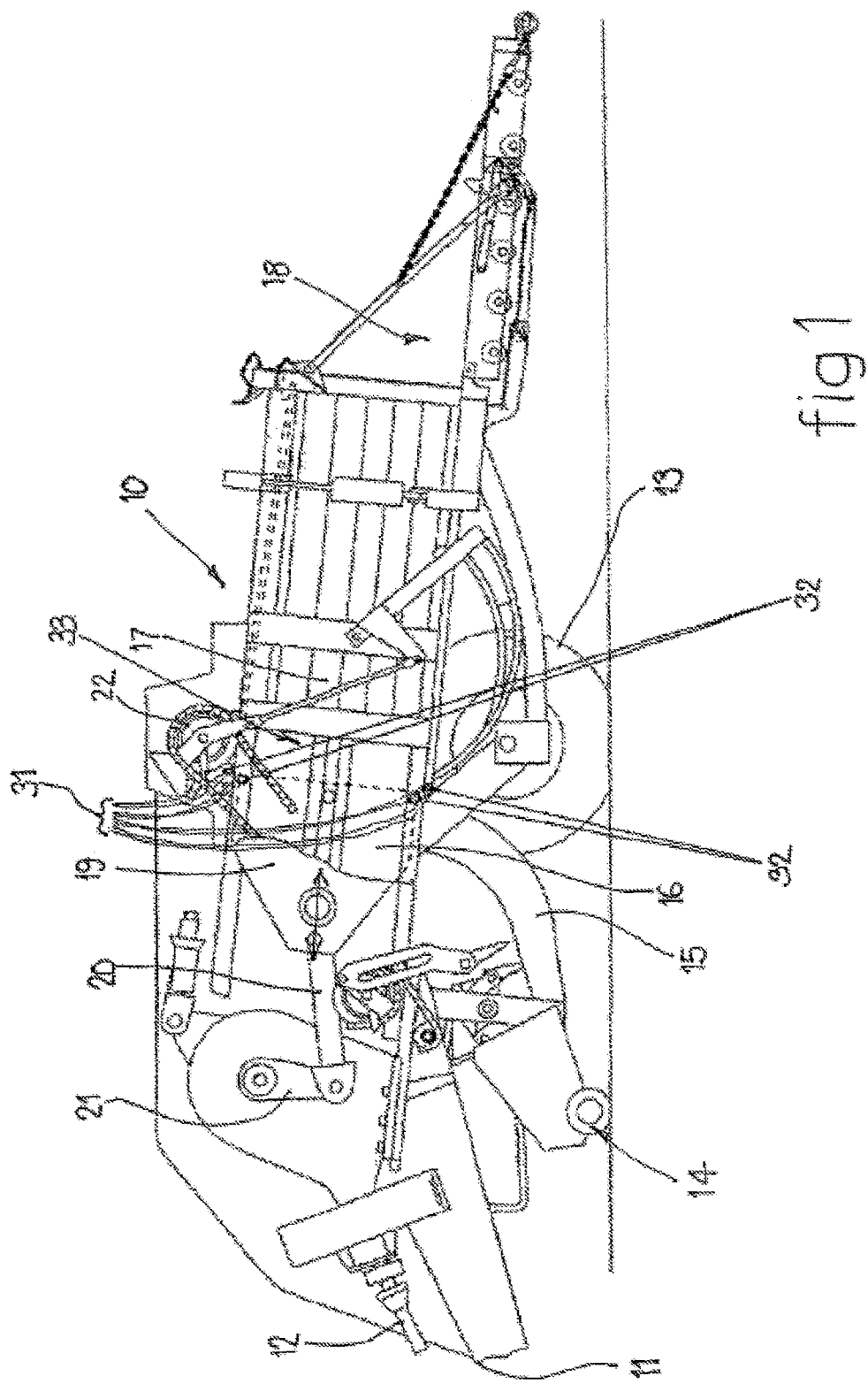
FIG. 1 is a schematic side elevation of a typical square or rectangle hay baler including parts applicable to the present invention.

Referring to the drawings, a hay baler 10 is schematically illustrated for producing square or rectangular hay bales. The hay baler 10 is typically drawn by a hitch means at a forward end 11, by a tractor (not shown). A power take off 12 from the tractor drives the hay baler 10. The hay baler 10 is supported by ground engaging wheels 13 which may be provided in fore and aft spaced pairs depending on the size of the baler 10. A forwardly located pick up mechanism 14 of any suitable type is provided to pick up cut grass, hay or similar vegetation material from the ground to pass same rearwardly and upwardly via a path or chute 15 to a precompression chamber 16. The precompression chamber 16 is essentially a forward end of a bale forming chamber 17 and a bale exit or discharge path 18, the chambers 16, 17 and the bale exit or discharge path 18 being generally disposed in line in the fore and aft direction of the baler 10 and define a fore and aft passage 33 for the production and discharge of hay bales in a rearward direction. The baler 10 further has a main compression plunger head 19 that is moved in the fore and aft direction by a connector rod 20 driven by a crank arm 21 which in turn is driven from the power take off 12.

The precompression chamber 16, the bale forming chamber 17 and the main compression plunger 19 all have a generally square or rectangular cross-sectional configuration when viewed in the fore and aft direction. Further the delivery path or chute 15 enters the precompression chamber 16 in a lateral or transverse direction. A formed bale metering wheel 22 with peripheral bale engaging teeth engaging the bale during forming, is normally provided to complete the bale and tie same with string tie mechanism (not shown) when the bale length reaches a particular desired limit. Conveniently the length metering wheel 22 engages with a top region of the bale approximately midway between the side edges of the bale being formed.

The foregoing describes one commonly known form of hay baler 10 for forming square or rectangular bales. The present invention relates to any form of hay baler 10 for producing square or rectangular hay bales. Those skilled in the art will recognize that the following description is applicable to other designs of hay balers for producing square or rectangular bales.

Figure 2:
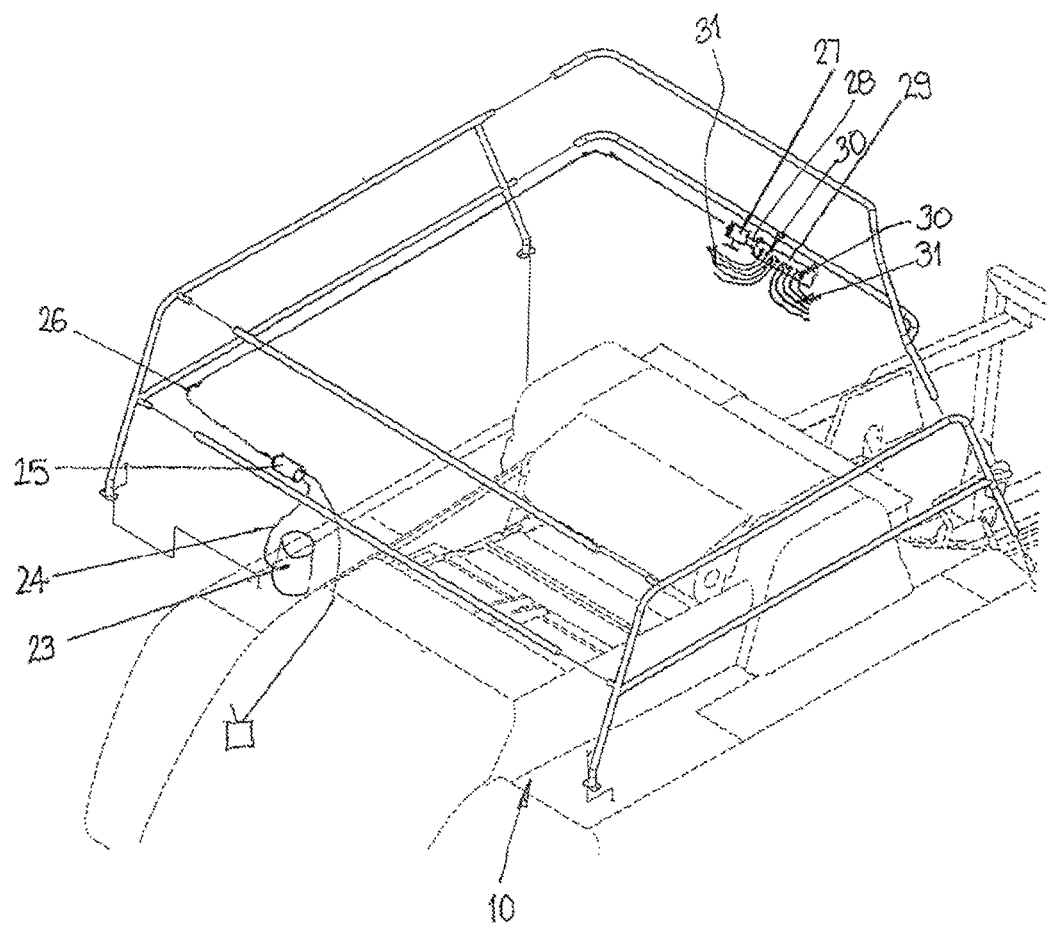
FIG. 2 is a partial perspective view of the outer forward region of the hay baler shown in FIG. 1 showing further parts applicable to the present invention.

Referring to FIG. 2, apparatus according to the present invention is schematically shown comprising a reservoir 23 for containing a supply of liquid surfactant or lubricant. The liquid surfactant or lubricant may be a food grade of oil such as canola oil but other food grade oils could also be used. The liquid surfactant or lubricant needs to be non-toxic as at least some of the material will be in contact with and at least partially coat at least some of the vegetation material being baled. Any other vegetable oil could also be used. A flow line 24 connects the reservoir 23 to high pressure pump 25. The pump may be driven by an electric motor which may be a 12 volt motor driven from a power supply of the tractor. Any form of pump could be used including a mechanical pump. The flow line 24, in one preferred embodiment might be a quarter inch nylon 120 psi brake hose. A flow line 26 connects the pump 25 to an adjustable flow valve 27 which in turn is connected via a flow line 28 to a distribution manifold 29. The distribution manifold 29 might include any number of discharge ports 30 to which a distribution line 31 is connected. Each of the distribution lines 31 might be ⅛ inch 120 psi brake hose lines. Preferably, each distribution line 31 should be of equal length.

Each of the distribution lines 31 pass from the manifold 29 to a discharge outlet 32 allowing the liquid surfactant or lubricant to be sprayed into the fore and aft passage 33, preferably just forward of the most forward point of movement of the forward face region of the main compression plunger head 19. The distribution lines 31 are conveniently connected via quick connection and release couplings to the discharge outlets 32. In one preferred embodiment, the discharge outlets 32 are spray or drip nozzles but other forms of discharge means can be used. It is desirable that the lubricant be applied at the full stroke of the plunger head 19 such that the lubricant will continue down the chamber with the baled material. When the plunger head 19 retracts, the hay material continues with it and therefore lubricates the chambers 16, 17 along their length. In another preferred embodiment, the discharge outlets 32 are disposed in or closely to a plane transverse to the fore and aft passage adjacent the forward plane of the plunger head 19 when in its forward most position. In one preferred embodiment, the discharge outlets may be spaced around the perimeter of the fore and aft passage 33 formed by the chambers 16, 17. Conveniently two spaced discharge outlets 32 may be provided directed inwardly from each of a top wall, a bottom wall and each opposed side walls forward of the forward extent of travel of the plunger head 19. The intention is to coat each of the surfaces facing the vegetation material in the fore and aft passage 33 and the foregoing provides the currently preferred arrangement, however, other arrangements are believed possible. For example, the surfactant or lubricant could be sprayed into the passage 15 adjacent its entry point into the precompression chamber 16 or into the precompression chamber 16 itself whereby the hay material itself might carry the lubricant material to the surfaces in the main compression chambers 16, 17.

A preferred embodiment has been described by way of example only. Further modifications to the above arrangements are believed possible without departing from the scope of the invention or annexed claims.

The claims defining the invention are as follows:

1. A square or rectangular hay baler including:
    a fore and aft hay bale forming zone having inwardly facing surfaces which define a square or rectangular internal cross-section;
    a cut vegetation pick up and delivery arrangement arranged to deliver cut vegetation to said hay bale forming zone;
    a compression plunger movable in the fore and aft direction and arranged to compress cut vegetation into a square or rectangular bale in said hay bale forming zone;
    a reservoir arranged to retain a supply of non-toxic liquid surfactant or lubricant; and
    a pump arranged to pump said non-toxic liquid surfactant or lubricant from said reservoir at a supply pressure to one or more discharge outlets in said hay baler,
    wherein a plurality of discharge outlets are mounted to or adjacent said fore and aft hay bale forming zone, each of said discharge outlets being connected to said pump, and
    whereby, in use, said discharge outlets deliver said non-toxic liquid surfactant or lubricant in an outward direction so that said inwardly facing surfaces of said fore and aft hay bale forming zone are at least partially coated with said non-toxic liquid surfactant or lubricant.

2. A hay baler according to claim 1 wherein said fore and aft hay baling forming zone includes a precompression chamber, a bale compression chamber, and a bale discharge passage, all arranged in the fore and aft direction.

3. A hay baler according to claim 2 wherein said cut vegetation pick up and delivery arrangement is configured to deliver said cut vegetation to said precompression chamber.

4. A hay baler according to claim 1 wherein each of said discharge outlets is a spray nozzle arranged to spray said non-toxic liquid surfactant or lubricant onto said inwardly facing surfaces of said fore and aft hay bale forming zone.

5. A hay baler according to claim 1 wherein said discharge outlets are all arranged in a plane transverse to said fore and aft direction.

6. A hay baler according to claim 5 wherein said plane transverse to said fore and aft direction is located forward of a forward limit position of a forward face of said compression plunger.

7. A hay baler according to claim 6 wherein said plane is located about 15 mm forward of said forward limit position of the forward face of said compression plunger.

8. A hay baler according to claim 6 wherein said plane is located less than about 15 mm forward of said forward limit position of the forward face of said compression plunger.

9. A hay baler according to claim 1 wherein the discharge outlets are spaced from each other about a periphery of said fore and aft hay bale forming zone.

10. A hay baler according to claim 1 wherein at least one discharge outlet for said non-toxic liquid surfactant or lubricant is positioned to supply said non-toxic liquid surfactant or lubricant to a region of a delivery chute forming part of the cut vegetation pick up and delivery arrangement.

11. A hay baler according to claim 10 wherein the at least one discharge outlet is positioned in said delivery chute adjacent a precompression chamber of said fore and aft hay bale forming zone.

12. A hay baler according to claim 2 wherein at least one discharge outlet for said non-toxic liquid surfactant or lubricant is positioned to deliver said non-toxic liquid surfactant or lubricant to said precompression chamber.

13. A hay baler according to claim 1 wherein said non-toxic liquid surfactant or lubricant is a food grade oil.

14. A hay baler according to claim 1 wherein a first flow line is provided between said pump and a distribution manifold, an adjustable flow rate control device being provided in said first flow line.

15. A hay baler according to claim 14, the hay baler further including a plurality of second flow lines, each of said second flow lines extending from said distribution manifold to a respective one of said discharge outlets.

16. A hay baler according to claim 1 wherein said non-toxic liquid surfactant or lubricant is a vegetable oil.

* * * * *